United States Patent
Blasko et al.

(10) Patent No.: US 6,776,195 B2
(45) Date of Patent: Aug. 17, 2004

(54) TUBULAR POLYMERIC COMPOSITES FOR TUBING AND HOSE CONSTRUCTIONS

(75) Inventors: Daniel S. Blasko, Kent, OH (US); William C. Fisher, Cuyahoga Falls, OH (US); Michael R. Swails, Madison, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 124 days.

(21) Appl. No.: 10/108,715

(22) Filed: Mar. 26, 2002

(65) Prior Publication Data

US 2002/0134451 A1 Sep. 26, 2002

Related U.S. Application Data

(60) Provisional application No. 60/278,871, filed on Mar. 26, 2001, and provisional application No. 60/283,118, filed on Apr. 11, 2001.

(51) Int. Cl.[7] .................................................. F16L 9/14
(52) U.S. Cl. ..................... 138/141; 138/137; 138/140
(58) Field of Search ............................... 138/141, 140, 138/123–126, 137, 129, 130, 144–146, DIG. 1

(56) References Cited

U.S. PATENT DOCUMENTS

| | | | | |
|---|---|---|---|---|
| 3,722,550 A | | 3/1973 | Matthews | 138/137 |
| 3,977,440 A | * | 8/1976 | Phillippi | 138/125 |
| 4,009,734 A | * | 3/1977 | Sullivan | 138/125 |
| 4,603,712 A | | 8/1986 | Krause | 138/137 |
| 5,232,645 A | * | 8/1993 | Ramos, Jr. | 264/103 |
| 5,258,213 A | | 11/1993 | Mugge et al. | 428/36.91 |
| 5,313,987 A | | 5/1994 | Rober et al. | 138/137 |
| 5,474,822 A | | 12/1995 | Rober et al. | 428/36.91 |
| 5,662,975 A | | 9/1997 | Hert et al. | 428/36.91 |
| 5,937,911 A | * | 8/1999 | Kodama et al. | 138/137 |
| 6,066,377 A | | 5/2000 | Tonyali et al. | 428/36.3 |
| 6,071,579 A | | 6/2000 | Green et al. | 428/36.3 |
| 6,098,666 A | | 8/2000 | Wells et al. | 138/115 |
| 6,216,744 B1 | * | 4/2001 | Leray et al. | 138/125 |
| 6,302,153 B1 | * | 10/2001 | Merziger | 138/137 |
| 6,355,321 B1 | * | 3/2002 | Nishino et al. | 428/36.91 |
| 6,372,870 B1 | * | 4/2002 | Kitahara et al. | 526/250 |
| RE38,087 E | | 4/2003 | Yokoe et al. | 428/36.91 |
| 6,604,551 B2 | * | 8/2003 | Nishi et al. | 138/137 |
| 6,619,330 B2 | * | 9/2003 | Ito et al. | 138/137 |
| 6,634,389 B2 | * | 10/2003 | Noone et al. | 138/137 |
| 6,656,553 B2 | * | 12/2003 | Nishi et al. | 428/36.91 |

FOREIGN PATENT DOCUMENTS

| | | |
|---|---|---|
| FR | 2 689 956 | 10/1993 |
| WO | WO 93/14933 | 8/1993 |

OTHER PUBLICATIONS

Parker Fluid Connectors Catalog 4660 for Parflex Thermoplastic Hose, Tubing, Fittings and Accessories, dated Mar. 1, 2000.

* cited by examiner

Primary Examiner—Patrick Brinson
(74) Attorney, Agent, or Firm—John A. Molnar, Jr.

(57) ABSTRACT

Multi-layer tubular polymeric composite and to articles such as tubing and hoses constructed thereof. The composite is formed of a layer of a fluoropolymer material bonded directly to a second layer of a more general purpose resin material which may be a nylon or other polyamide.

18 Claims, 2 Drawing Sheets

TUBULAR POLYMERIC COMPOSITES FOR TUBING AND HOSE CONSTRUCTIONS

CROSS-REFERENCE TO RELATED CASES

The present application claims the benefit of the filing date of U.S. Provisional Application Ser. No. 60/278,871; filed Mar. 26, 2001 and U.S. Provisional Application Ser. No. 60/283,118; filed Apr. 11, 2001, the disclosures of which are incorporated herein by reference.

BACKGROUND OF THE INVENTION

The present invention relates broadly to two or more layer tubular polymeric laminates or composites and to articles such as tubing and hoses constructed thereof, and more particularly to tubular polymeric laminates or composites formed of a layer of a thermoplastic fluoropolymer material bonded directly to a layer of a more general purpose thermoplastic resin material which may be a nylon or other polyamide.

Fluoropolymers are known to exhibit exceptional resistance to chemical degradation and vapor permeation. Accordingly, these materials are desirable for use as liners in tubing, hoses, and other conduits such as for conveying fuel or fuel vapor in automotive, aerospace, or marine applications, or for conveying petroleum and other hydrocarbons and organic or inorganic solvents in a variety of transport, motion control, natural resource recovery, and chemical process applications. However, fluoropolymers also known to have low surface energies and high electronegativites which, although contributing to the lubricity and "non-stick" properties of such materials, often makes the bonding of other materials thereto difficult.

Heretofore, conventional techniques for laminating polyamides, polyurethanes, and other common polymeric materials to fluoropolymers has been to etch the surface of the fluoropolymer by treatment with a chemical, such as a solution of sodium or other alkali metal in anunonium, an amine, or other solvent, or with a plasma. In general, such treatments, which are further described in U.S. Pat. Nos. 2,789,063; 5,062,456; and 5,653,266, and in Benderly, A. A., J. Appl. Polym. Sci., 6(20), 221–225 (1962), and Schonhorn, H., Hansen, R. H., J. Appl. Polym. Sci., 11, 1461–1474 (1967), are known to be more effective when the fluoropolymer contains reactive chemical groups. Other methods of bonding PTFE and other fluoropolymers, and the use of such methods in the manufacture of articles such as tubing and ion exchange members, are described in U.S. Pat. Nos. 6,016,848; 5,653,266; 5,599,614; 5,141,800; and 4,954,388, and in International. (PCT) Publ. No. WO 95/16730.

Another technique, often used in the construction of multi-layer tubing for fuel line applications, involves the provision of a bonding or tie layer between an inner fluoropolymer layer or liner and a second layer of a stronger, tougher, and, typically, less-expensive material, such as a nylon, polyamide, or polyurethane, which is used as a reinforcement or cover for the liner. The tie layer, which may be formed as a co- or tri-extrusion with the liner and second layers, is formulated to be compatible chemically with both the fluoropolymer material of the liner and the material of the second layer such that a thermal fusion bond may be achieved between the liner and tie layer and the tie layer and second layer to thereby consolidate the tubing into an integral structure. The use of such tie layers dictates the selection of specific materials for the liner and second layer so as to be compatible with the material of the tie layer, or vice versa, and is believed limited to the use of melt processible fluoropolymers such as polyvinylidene fluoride (PVDF) or ethylene tetraflurorethylene (ETFE). The use of tie layers in the bonding of multi-layer tubing constructions is described further in U.S. Pat. Nos. 6,066,377; 6,041,826; 6,039,085; 6,012,496; 5,996,642; 5,937,911; 5,891,373; 5,884,672; 5,884,671; 5,865,218; 5,743,304; 5,716,684; 5,678,611; 5,570,711; 5,566,720; 5,524,673; 5,507,320; 5,500,263; 5,480,271; 5,469,892; 5,460,771; 5,419,374, 5,383,087; 5,284,184; 5,219,003; 5,167,259; 5,167,259; 5,112,692; 5,112,692; 5,093,166; 5,076,329; 5,076,329; 5,038,833; 5,038,833; 4,706,713; 4,627,844; and 3,561,493, in German Patent Publ. Nos. DE 4001126; 3942354; and 3921723; and 3821723, in Japanese Patent Publ. Nos. JP 61171982; 4224939; and 140585, in Europe Patent Publ. Nos. EP 1002980 and 551094, in International (PCT) Publ. Nos. WO 99/41538; 99/41073; 97/44186; and 93/21466, and in U.K. Patent Publ. No. GB 2204376.

More recently, and as is described further in European Patent Publ. No. EP 992,518, modified fluoropolymer materials have been developed which may be fusion bonded, such as by co-extrusion or molding, to polyamides and epoxies. Such materials are formulated as a fluororesin copolymer having terminal carbonate end groups.

The fluororesin copolymer may comprise, based on the copolymer, between about 30–81 mole % of a tetrafluoroethylene (TFE) monomer, and about 19–70 mole % of at least one other monomer. A preferred composition is a terpolymer of about 40–81 mole % TFE, 6–43 mole % ethylene, and 10–30 mole % of hexafluoropropylene (HFP), and in that regard may be characterized as a modified ethylene tetraflurorethylene (ETFE) copolymer or as an "EFEP" (ethylene-perfluoroethylene) copolymer. The composition also may contain 0–10 mole % of a fluorovinyl compound. The carbonate end groups, which may be incorporated into the copolymer chains by the use of a peroxycarbonate polymerization initiator, may be considered an activator in having a high reactivity with the polyamides bonds and/or terminal amino or carboxyl groups of materials such as polyamides.

Advantageously, these modified fluoropolymer materials are able to be fusion bonded, such as by co-extrusion or molding, to a general purpose resin such as a polyamide or epoxy at a temperature below the thermal decomposition temperature of the resin, and preferably at a temperature within the range of between about 150–260° C. other otherwise within the range of the preferred fusion bonding temperature of the resin. In this regard, the fluororesin copolymer may be formulated to have a melt viscosity which allows flow of the copolymer within such temperature range. Modified fluoropolymer materials of the above-described type are sold commercially by Daikin America, Inc. (Orangeburg, N.Y.) under the designations Neoflon™ RP-5000 and RP-5000AS Series.

It is believed that tubular polymeric composites of two or more layers including a fluororesin layer fusion bonded directly to a nylon or other amide or general purpose resin layer would be useful as elements in a variety of hose and tubing constructions. In this regard, in severe or even normal service environments, such as in mobile or industrial hydraulic and pneumatic applications, or in crude oil and other energy recovery applications, hoses and tubing of the type herein involved may be exposed to a variety of environmental factors and mechanical stresses that cannot always be predicted. It is anticipated, therefore, that tubing and hose constructions which offer chemical and/or moisture resistance, but which are still economical would be wellreceived by numerous industries for use in high pressure and other fluid transfer and motion control applications.

BROAD STATEMENT OF THE INVENTION

The present invention is directed to polymeric composites and articles such as tubing and hoses constructed thereof. More particularly, the invention is directed to a two or more layer tubular composite which may be formed by fusion bonding, such as by extrusion, co-extrusion, or molding. In being formed of a layer of a thermoplastic fluoropolymer material which may be bonded directly, i.e., without the use of an adhesive or tie layer, to a layer of a more general purpose thermoplastic resin material which may be a nylon or other polyamide, the composite of the invention is particularly adapted for use as a core tube in a reinforced hose construction, and as tubing for vehicular airbrake systems and other applications requiring chemical and/or environmental resistance. Typically, the fluoropolymer material layer, which may be both chemically and environmentally-resistant, is provided as an innermost or outermost layer of the composite structure or member and of the article constructed thereof.

In a representative hose embodiment, the composite structure of the invention may be formed as having an inner fluoropolymer layer, and an outer nylon or other resin layer bonded directly to the fluoropolymer layer. The structure so formed may be used as a core tube over which one or more layers of a fibrous reinforcement layer are braided or wound to provide resistance to internal pressure, such as in the case of a medium or high pressure, i.e., 150–60,000 psi (1–413 MPa), hose construction, or to external pressure such as in the case of a collapse-resistant hose for oil recovery, vacuum, or other applications. Advantageously, the inner fluoropolymer layer of the composite structure may form the innermost layer of the hose and thereby provide internal chemical resistance. Also, the composite structure of the invention, as formed as having an inner and/or outer fluoropolymer layer, alternatively or in addition to the core tube may be provided between a cover, which itself may be the nylon or other resin layer of the composite or a polyurethane or other layer surrounding the composite, and the reinforcement layers of the hose so as to provide resistance to the penetration of external moisture or chemicals.

In a representative tubing embodiment, the composite structure of the invention may be formed as having an inner nylon or other resin layer, which may be reinforced or unreinforced, and an outer fluoropolymer layer bonded directly to the resin layer. The structure so formed may be used, either as coiled or uncoiled, as tubing such as for tractor/trailer airbrake systems. Advantageously, the outer fluoropolymer layer of the composite structure may form the outermost layer of the tubing and thereby provide external chemical resistance such as against methanol and other solvents and corrodants which may be used in the cleaning of the vehicle.

The present invention, accordingly, comprises the structures and article constructed thereof possessing the combination of elements which are exemplified in the detailed disclosure to follow. Advantages of the present invention include a tubular composite structure which may be used alone as tubing or as core tube in combination with other materials in a multitude of hose arrangements to provide resistance to internal and/or external chemicals and moisture. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

Figure 1:
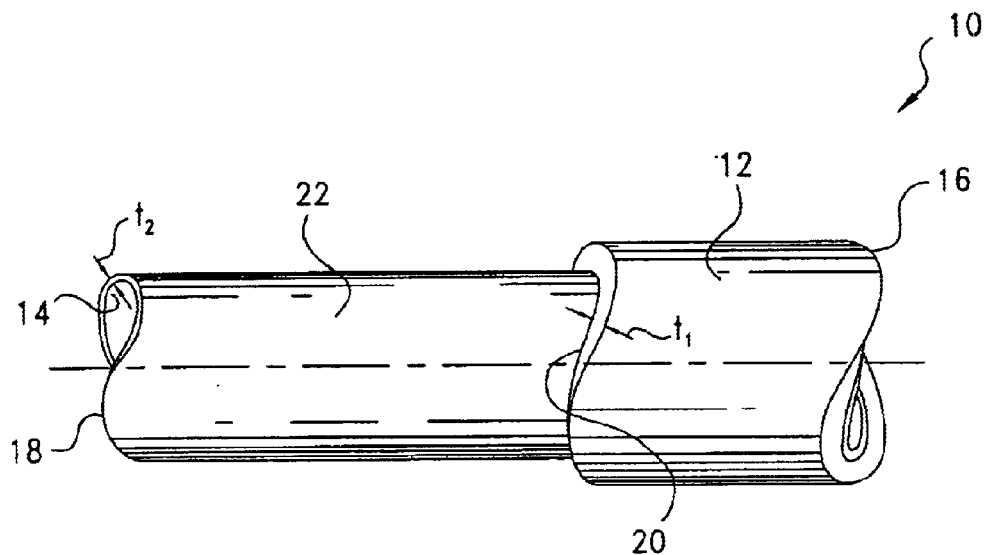
FIG. 1 is a side elevational, cut-away view of a representative tubular polymeric composite member according to the present invention.

The drawings will be described further in connection with the following Detailed Description of the Invention.

DETAILED DESCRIPTION OF THE INVENTION

Certain terminology may be employed in the description to follow for convenience rather than for any limiting purpose. For example, the terms "forward," "rearward," "right," "left," "upper," and "lower" designate directions in the drawings to which reference is made, with the terms "inward," "interior," "inner," or "inboard" and "outward," "exterior," "outer," or "outboard" referring, respectively, to directions toward and away from the center of the referenced element, and the terms "radial" or "horizontal" and "axial" or "vertical" referring, respectively, to directions, axes, planes perpendicular and parallel to the central longitudinal axis of the referenced element. Terminology of similar import other than the words specifically mentioned above likewise is to be considered as being used for purposes of convenience rather than in any limiting sense.

In the figures, elements having an alphanumeric designation may be referenced herein collectively or in the alternative, as will be apparent from context, by the numeric portion of the designation only. Further, the constituent parts of various elements in the figures may be designated with separate reference numerals which shall be understood to refer to that constituent part of the element and not the element as a whole. General references, along with references to spaces, surfaces, dimensions, and extents, may be designated with arrows.

For the illustrative purposes of the discourse to follow, the precepts of the two or more layer tubular polymeric composite or laminate of the invention herein involved are described in connection with its utilization as a core tube or other member within a flexible pressure or vacuum hose construction such as for fuel transfer, oil or other natural resource recovery, chemical or pharmaceutical processing, or other applications requiring chemical or environmental resistance, or for use by itself as flexible tubing such as for airbrake applications. It will be appreciated, however, that aspects of the present invention may find use in other hose and tubing constructions in other fluid transfer applications, and in a variety of hydraulic or pneumatic power or control applications. Use within those such other applications therefore should be considered to be expressly within the scope of the present invention.

Referring then to the figures wherein corresponding reference characters are used to designate corresponding elements throughout the several views with equivalent elements being referenced with prime or sequential alphanumeric designations, a representative two or more layer tubular polymeric composite member in accordance with the present invention is shown generally in perspective cut-away at 10 in FIG. 1. In basic construction, member 10 has an outer circumferential surface, 12, and an inner circumferential surface, 14, and is formed of as a laminate of a tubular first layer, 16, and a tubular second layer, 18, which is concentric with and integrally adjoins the first layer 16. Although the member outer surface 12 is shown to be formed of the first layer 16, and the member inner surface 14 is shown to be formed of the second layer 18, the relative orientation of the layers may be reversed such that the outer surface 12 is formed of the second layer 18, and the inner surface 14 is formed of the first layer 16. Also, although the outer and inner surfaces 12 and 14 are shown to be, respectively, the innermost and outermost surfaces of the member 10, it will be appreciated that in a multi-layer structure of member 10, one or more additional layers may be provided to surround the member outer surface 12, and/or one or more additional layers may be provided to be surrounded by the member inner surface 14.

The wall thicknesses of each of the layers 16 and 18 may be of any thickness, both absolute and relative to the thickness of the other layer, but for many applications, and as may be irrespective of which of the layers 16 and 18 forms the outer surface 12 and which forms the inner surface 14, the first layer 16 may be relatively thick as having a thickness, referenced at "$t_1$", of between about 0.025–0.25 inch (0.63–6.4 mm), with second layer 18 being relatively thin as having a thickness, referenced at "t2", of between about 0.001–0.1 inch (0.02–2.50 mm). For cost considerations, the wall thickness $t_2$ of the second layer 18 may be maintained at the minimum necessary to provide the desired solvent, gas, or liquid permeation resistance, while for strength and flexibility considerations, the thickness $t_1$ of the first layer 16 will be 1.25–75 times thicker than the thickness $t_2$. Overall, member 10 may be of any diametric and lengthwise extent, and may be generally round in cross-section as shown, but alternatively may be of an elliptical, polygonal, or other geometric cross-section.

The first layer 16 is formed of a first thermoplastic material, and the second layer 18 is formed of a second thermoplastic material different from the first material. In this regard, and as may be seen in cut-away in FIG. 1, the inner surface, 20, of the first layer 16 itself, and the outer surface, 22, of the second layer 18 itself, or vice versa as the case may be, are directly bonded together, i.e., without the use of an intermediate tie-layer or adhesive, and also generally without preparation, priming, or other or treatment of surfaces 20 and 22 so as to allow the member 10 to be formed by a continuous co-extrusion or other extrusion such as cross-head or sequential extrusion, in addition to molding or co-molding, or other processes such as coating, or a combination of extrusion, molding, and/or coating. With the layers 16 and 18 being co-extruded or otherwise formed, a thermal "fusion" bond may be formed therebetween, such as by the intermingling of melt material from the layers. The bond formed therebetween the layers 16 and 18 generally will depend upon the respective compositions thereof, but may consist of one or more components which may be chemical, such as by covalent, ionic, or hydrogen bonding or cross-linking reactions, electrostatic, van der Waals, or other attractive forces, or mechanical, such as by chain intermingling, in nature. With the application of pressure, such as die, hydrostatic, or mold pressure, followed by cooling to, for example, ambient temperature, an integral, cohesive fusion bond or "weld" is formed between the layers 16 and 18 which generally may have a bond strength, such as a peel strength, of between about 3.5–110 pounds per linear inch (pli) (5.25–192.6 Newtons per linear centimeter (N/cm)). Indeed, it has been observed that in some cases the bond achieved between the materials of the respective layers 16 and 18 is such that the tensile strength thereof exceeds the yield strength of the base materials, and in that regard the bond between the layers can be classified as inseparable.

First layer 16 may be formed of any thermoplastic material, which may be filled or unfilled, but for reasons of cost typically will be a general purpose resin. As used herein, the term "thermoplastic material" is used interchangeably with "melt processable material," and is in contrast to non-melt processable materials such as thermosets or non-thermosetting materials which otherwise exhibit a melt viscosity that is sufficiently high so as to preclude, flow and processing by conventional melt extrusion or molding operations, and therefore necessitating that the material be processed using sintering or solvent processing techniques. Such general purpose resin materials include polyamides, polyolefins, polyesters, polyvinyl chlorides, ethylene vinyl alcohols (EVA), polyacetals, polyoxymethylenes (POM), silicones, thermoplastic rubbers (TPR) such as polyolefin-ethylene-propylene-diene monomer (EPDM) and other blends, copolymer rubbers, thermoplastic polyurethanes (TPU) and other thermoplastic elastomers (TPE), and blends of any of the foregoing. Such resins typically will have a melting point of between about 110–230° C., and a thermal decomposition temperature, which defines the upper processing limit of the resin, of between about 150–260° C. As used herein, "melting point" may be a transition from a form-stable crystalline or glassy solid phase to a softened or otherwise viscous phase which may be generally characterized as exhibiting intermolecular chain rotation and, as between layers, chain diffusion and/or other intermingling. For amorphous or other thermoplastic resins not having a clearly defined melting peak, the term melting point also is used interchangeably with glass transition or softening point.

In many applications, a polyamide and, particularly, a plasticized or unplasticized nylon such as Nylon 6, 6/66, 11, 12, or 6/12, may be preferred. The specific nylon may be chosen for reasons of cost and/or for service temperature, chemical compatibility with the fluid being handled, fluid, solvent, moisture, or environmental resistance, flexural modulus, hardness, or other physical property, and typically will have a melting point of between about 175–235° C. and a thermal decomposition temperature of between about 195–280° C.

Second layer 18 preferably is formed of fluoropolymer material which is more chemically-resistant, but typically higher in cost and less flexible, impact resistant, or otherwise less strong or tough than the resin material of the first layer 12. As used herein, "chemical resistance" should be understood to mean the ability to resist swelling, crazing, stress cracking, corrosion, or otherwise to withstand attack from mild acidic or alkaline solutions, phosphate-ester solutions, and alcohols and other organic solvents and hydrocarbons, as well as inorganic solvents such as water or brine.

The fluoropolymer material may be as is described in European Patent Publ. No. EP 992,518, and in that regard may be an ETFE-based fluoropolymer material that has been modified, i.e., an EFEP, to be melt processible, such as by co-extrusion or molding, to the nylon or other polyamide or other resin material of the first layer 16. As mentioned, such fluoropolymer material may be formulated as a fluororesin copolymer having terminal functional groups, which may be carbonate end groups, which are reactive with the amide or other functional groups of the nylon or other resin material of the first layer 16.

The fluoroiesin copolymer may comprise, based on the copolymer, between about 30–81 mole % of a tetrafluoroethylene (TFE) monomer, and about 19–70 mole % of at least one other monomer. A preferred composition is a terpolymer of about 40–81 mole % TFE, 6–43 mole % ethylene, and 10–30 mole % of hexafluoropropylene (HFP), and in that regard may be characterized as a modified ethylene tetraflurorethylene (ETFE) copolymer or as an "EFEP" (ethylene-perfluoroethylene) copolymer. The composition also may contain 0–10 mole % of a fluorovinyl compound. The carbonate end groups, which may be incorporated into the copolymer chains by the use of a peroxycarbonate polymerization initiator, may be considered an activator in having a high reactivity with the polyamides bonds and/or terminal amino or carboxyl groups of materials such as polyamides.

Advantageously, these modified fluoropolymer materials are able to be fusion bonded, such as by co-extrusion or molding, to a general purpose resin such as a nylon or other polyamide at a temperature below the thermal decomposition temperature of the resin, and preferably at a temperature within the range of between about 150–280° C. or otherwise within the range of the preferred fusion bonding temperature of the resin. In this regard, the fluororesin copolymer may be formulated to have melting point, such as between about 90–200° C., and a melt viscosity, such as a melt flow rate of between about 0.1–100 g/10 minutes under a load of 5 kg, which allows flow of the copolymer within such fusion bonding temperature range of the resin. Modified ETFE, i.e., EFEP. fluoropolymer materials of the above-described type are sold commercially by Daikin America, Inc. (Orangeburg, N.Y.) under the designations Neoflon™ RP-5000 and RP-5000AS Series. Such materials have a melting point of about 195° C., which is lower than the melting point of 220° C. or higher for unmodified or conventionally modified ETFE materials.

As depending upon the requirements of the particular application involved, one or both of the first and second thermoplastic materials of the layers 16 and 18 may be compounded with one or more fillers and additives. Such fillers and additives, which may be in liquid, powder, particulate, flake, fiber, or other form, may include electrically-conductive fillers, pigments, microwave-attenuating fillers, thermally-conductive fillers, lubricants, wetting agents, stabilizers, antioxidants, pigments, coloring or opacifying agents, luminescents, light reflectants, chain extending oils, tackifiers, blowing agents, foaming or anti-foaming agents, reinforcements such as glass, carbon, or textile fibers, and fire retardants such as halogenated compounds, metal oxides and salts, intercalated graphite particles, borates, siloxanes, phosphates, glass, hollow or solid glass or elastomeric microspheres, silica, silicates, mica, and the like. Typically, the fillers and additives are blended or otherwise admixed with the base material, and may comprise between about 0.1% and 80% or more by total volume of the formulation.

Figure 2:
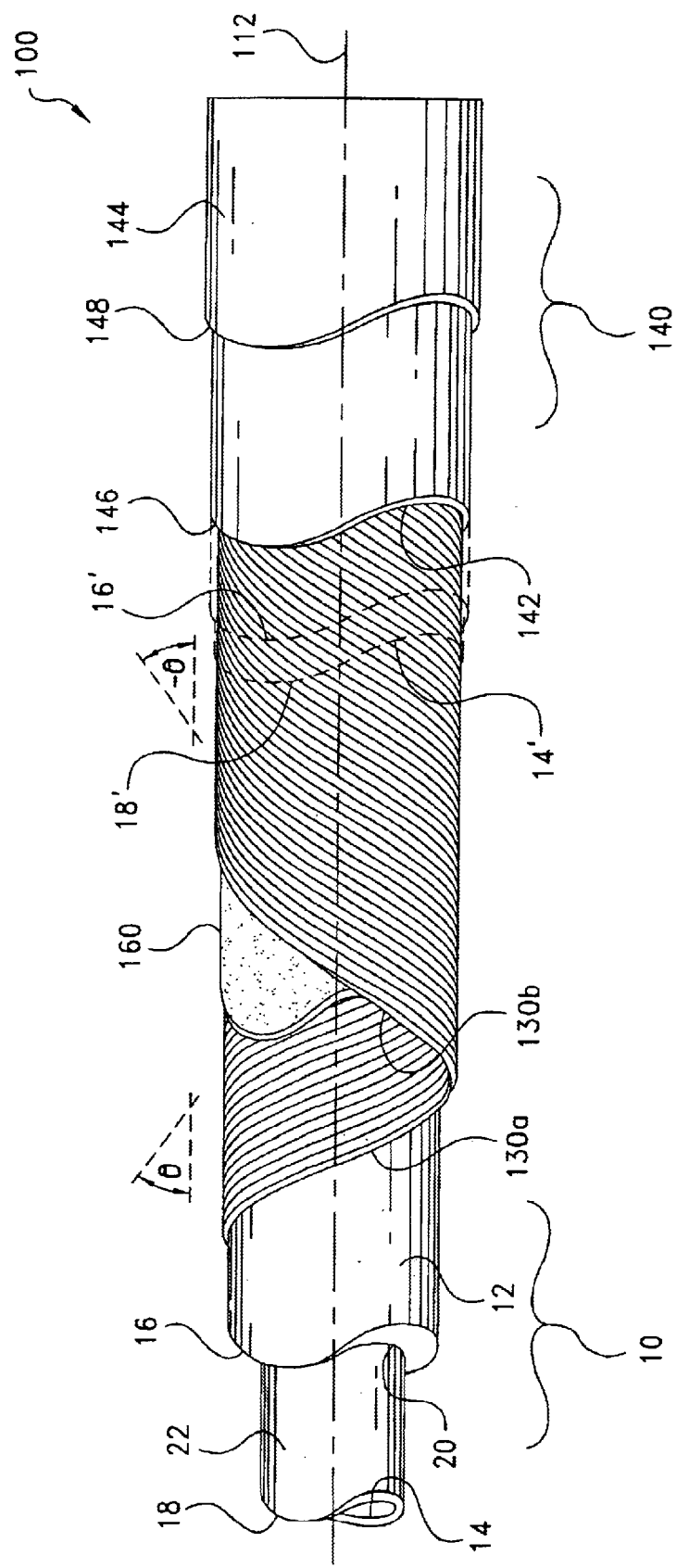
FIG. 2 is a side elevational, cut-away view of a representative embodiment of a flexible thermoplastic reinforced hose construction including the composite member of FIG. 1.

Turning next to FIG. 2, a representative hose construction incorporating member 10 of the present invention is shown generally at 100 in the cut-away view of FIG. 2 as extending along a central longitudinal axis, 112. In the hose 100, the composite member 10 is provided as a core about which the remainder of the hose is constructed, and in that regard the member inner surface 14 forms the innermost surface of the hose and defines the inner diameter thereof.

As is shown in FIG. 2, one or more reinforcement layers, 130*a–b*, may be provided as wound on directly or otherwise to surround the outer surface 12 of the member 10. Each of the reinforcement layers 130 may be conventionally formed as braided, knitted, wrapped, or, as is shown, spiral, i.e., helically, wound of, for example, from 1 to about 60 ends of monofilament, continuous multi-filament, i.e., yarn, stranded, cord, roving, thread, tape, or ply, or short "staple" strands of a fiber material. The fiber material, which may be the same or different in layers 130*a–b*, may be a natural or synthetic polymeric material such as a nylon, cotton, polyester, polyamide, aramid, polyolefin, polyvinyl alcohol (PVA), polyvinyl acetate, or polyphenylene bezobisoxazole (PBO), or blend, a steel, which may be stainless or galvanized, brass, zinc or zinc-plated, or other metal wire, or a blend thereof.

In the illustrated spiral wound construction 100 of FIG. 2, which also may contain additional braided and/or knitted layers (not shown), the reinforcement layers 130 are oppositely wound in pairs so as to counterbalance torsional twisting effects. For each of the spiral wound layers 130*a–b*, from 1 to about 60 parallel ends of, preferably, a 420–6600 denier (470–7400 decitex), multi-filament aramid, polyester, nylon, PVA, or PBO yarn may be helically wound under tension in one direction, i.e., either left or right hand, with the next immediately succeeding layer 130 being wound in the opposite direction. The layers 130*a–b* may be wound as is shown in FIG. 2 directly over the outer surface 12 of member 10, or, alternatively, over one or more intervening reinforcement or other layers, as having a predetermined pitched angle, referenced at θ in FIG. 2 for layer 130*a* and at −θ for layer 130*b*, measured relative to the longitudinal axis 112 of the hose 100.

To better control the elongation and contraction of hose 100, and for improved impulse fatigue life, the innermost reinforcement layer 130*a* may be bonded, by means of fusion, mechanical, chemical, or adhesive bonding, or a combination thereof or otherwise, to the outer circumferential outer surface 12 of member 10. Such bond may be effected by solvalting, tackifying, or plasticizing the surface 12 with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane, epoxy, vinyl chloride, vinyl acetate, methyl acrylic, or other adhesive having an affinity to the materials forming surface 12 and layer 130*a*, or otherwise in the manner described, for example, in U.S. Pat. Nos. 3,654,967; 3,682,201; 3,773,089; 3,790,419; 3,861,973; 3,881,975; 3,905,398; 3,914,146; 3,982,982; 3,988,188; 4,007,070; 4,064,913; 4,343,333; 4,898,212; and in Japanese (Kokai) Publ. No. 10-169854 A2 and Canadian Patent No. 973,074.

The outermost reinforcement layer 130*b*, in turn, may be sheathed within one or more layers of a coaxially-surrounding protective cover or jacket, referenced at 140, having a circumferential interior surface, 142, and an opposing circumferential exterior surface, 144. Depending upon its construction, cover 140 may be spray-applied, dip coated, cross-heal or co-extruded, or otherwise conventionally extruded, spiral or longitudinally, i.e., "cigarette," wrapped, or braided over the reinforcement layer 130*b* as, for example, a 0.02–0.15 inch (0.5–3.8 mm) thick layer of an abrasion-resistant, preferably melt-processible, thermoplastic material, copolymer, alloy, or blend of a fiber, glass, ceramic, or metal-filled or unfilled polyamide, polyolefin, polyester, polyvinyl chloride, fluoropolymer, thermoplastic rubber (TPR), thermoplastic elastomer (TPE), thermoplastic olefin (TPO), or, most preferably, a thermoplastic polyurethane (TPU) elastomer. By "abrasion-resistant," it is meant that such thermoplastic material for forming cover 140 may have a hardness of between about 60–98 Shore A durometer. Cover 140 alternatively may be formed of a vulcanizable natural or synthetic rubber such as SBR, polybutadiene, EPDM, butyl, neoprene, nitrile, polyisoprene, silicone, fluorosilicone, buna-N, copolymer rubbers, or blends such as ethylene-propylene rubber. Any of these materials forming cover 140 may be loaded with metal particles, carbon black, or another electrically-conductive particulate, flake, or fiber filler so as to render hose 100 electrically-conductive for static dissipation or other applications. Separate electrically-conductive fiber or resin layers (not shown), which may be in the form of spiral or "cigarette-wrapped" tapes or otherwise provided, also may be included in the hose construction 100 between the member 10 and the innermost reinforcement layer 130a, between the reinforcement layers 130, or between the outermost reinforcement layer 130b and cover 140.

Similar to the bonding of member 10 to the innermost reinforcement layer 130a, the interior surface, 142 of cover 140 may be bonded to the outermost reinforcement layer 130b. Such bond, again, may be by fusion, chemical, mechanical, or adhesive means, or a combination thereof or other means, and preferably will exhibit a strength of at least about 8 pli (1.43 kg/linear cm). As before, the bond may be effected by solvating, tackifying, or plasticizing the surface of the outermost reinforcement layer 130b with an appropriate solvent, such as a carboxylic or other organic acid, tackifier, or plasticizer such as an aqueous or other solution of an amine such as n-methyl pyrrolidone or a phenol such as meta-cresol or resorcinol, or with the use of a urethane or other adhesive having an affinity to the materials forming reinforcement layer 130b and cover 140, or otherwise in the manner described in the above-cited references or in the manner to be described in connection with the bonding between layers 30a–b.

In the illustrative multi-layer construction of cover 140 shown in FIG. 2, cover 140 is provided as having an innermost cover layer, 146, which is formed of a first, preferably, thermoplastic material and which defines the interior cover surface 142, and a surrounding outermost cover layer, 148, which is formed of a second, preferably, thermoplastic material and which defines the exterior cover surface 144. Depending upon the application, the relative thicknesses of the layers 146 and 148 may be different or about the same. However, to further enhance the flexibility of hose 100, the first thermoplastic material forming the innermost cover layer 146 may be selected has having a flexural modulus which is lower than the flexural modulus of the outermost cover layer 148. In this way, the thickness of the less flexible outermost cover layer 148 may be decreased as compared to a single layer construction of cover 140. Although many combinations of materials may be used, the first thermoplastic material forming the more flexible innermost layer 146 may be a polyamide, polyolefin, polyester, EVA, TPO, TPE, TPU, TPR, fluoroelastomer or other fluoropolymer, polyvinyl chloride, silicone, polyurethane, a natural or synthetic rubber, or a copolymer of blend thereof, with the second material being, independently, a less flexible but harder, i.e., at least about 60 Shore A durometer, filled or unfilled polyamide, polyurethane, polyester, polyolefin, fluoropolymer, TPE, ionomer resin such as "Surlyn®" (DuPont, Wilmington, Del.), or a copolymer or blend thereof. If formed of chemically compatible thermoplastic materials, the respective layers 144 and 146 may be fusion bonded together at their interface. Alternatively, if formed of chemically incompatible materials, the respective layers 144 and 146 may be bonded together with an adhesive or by means of a surface treatment or tie layer (not shown) interposed therebetween.

With continuing reference to FIG. 2, each of the reinforcement layers, such as layer 130a, within hose 100 may be bonded, typically chemically and also, in most instances, mechanically, to its immediately succeeding layer, such as layer 130b, so as to provide for the more efficient transfer of induced internal or external stresses. By "chemically bonded," it is meant that the layers are bonded together, such as by fusion or cross-linking, directly or indirectly through an intermediate adhesive, resin, or other interlayer, as referenced at 160 in FIG. 2, or otherwise via a bonding agent, which may be a plasticizer, tackifier, solvent, or the like, such that atoms of the materials forming the reinforcement layers 130a–b are bonded to atoms of the other layer 130a or 130b or to atoms of the material forming interlayer 160. The chemical bond may be either covalent, ionic, or hydridic, i.e., hydrogen, bridge bonding, and may result, along with any mechanical bonding, in the formation of an integral reinforcement structure. Hose constructions of the type herein involved are described further in commonly-assigned, co-pending application U.S. Ser. No. 10/040,809, filed Jan. 8, 2002, and in the references cited therein. In a collapse-resistant construction, such as is described further in commonly-assigned, co-pending application U.S. Ser. No. 09/466,375, filed Dec. 17, 1999, reinforcement layers 130a–b alternatively may be provided as a spiral-wound metal or resin coil encapsulated between two elastomeric layers.

Although the hose construction 100 of FIG. 2 is shown to employ composite member 10 as a core, composite member 10 additionally or instead may be provided, as is shown in phantom at 16' and 18', with inner surface 14' surrounding the reinforcement layer 130 so as to provide, for example, protection against external moisture permeation, and/or as a substitute for the cover 140. Also, although the illustrative hose construction 100 has been described wherein two spiral wound reinforcement layers 130 are employed, other constructions may be envisioned. For example, and as was mentioned, one or more braided and/or knitted layers, which may be formed of natural, synthetic, or metal fiber, may be used in combination with, or instead of, the spiral wound layers 130 depending upon the specific requirements of the particular application involved.

Figure 3:
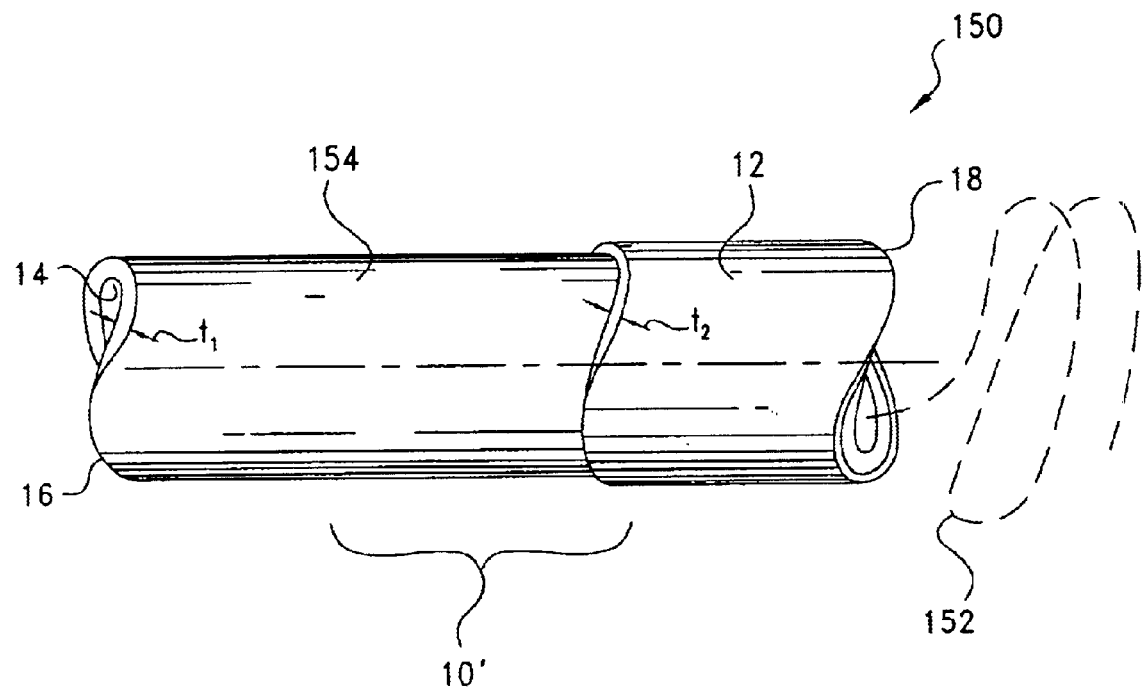
FIG. 3 is a side elevational, cut-away view of a representative embodiment of a flexible thermoplastic tubing construction including an alternative embodiment of the composite member of FIG. 1.

Turing next to FIG. 3, a representative tubing construction, such as for airbrake applications, is shown generally at 150, as incorporating member 10 of the invention which is now referenced at 10'. Member 10' is constructed generally as was described in connection with member 10 of FIG. 1, but as wherein the orientation of the first and second layers 16 and 18 is reversed such that the outer surface 12 of member 10' is formed of the fluoropolymer material of the second layer 18, which functions as a cover or jacket, while the inner surface 14 of member 10' is formed of the resin material of the first layer 16 which functions as a core. Further in this regard, the outer surface 12 of the member 10' may be seen to form the outermost surface of the tubing 150, with the inner surface 14 of the member 10' forming the innermost surface of the tubing 150. Accordingly, in tubing 150 the fluoropolymer material of the layer 18 may provide a protective barrier layer against external moisture and corrodants such as methanol and other solvents which may be used to clean the vehicle on which the tubing 150 is used. Tubing 150 may be linear and used in a harness or bundle or, and as is shown in phantom at 152, thermoformed or otherwise formed into helically-wound into a coil for use as a brake coil of the type described, for example, in commonly-assigned U.S. Pat. No. 6,098,666, and the references cited therein. Such coil may be both extendable and self-retracting. Representative airbrake and other coil tubing assemblies are shown in U.S. Pat. Nos. 3,3,977,440; 4,009,734; and 5,232,645; and in U.K. Patent Application 2,239,503.

In a reinforced construction, the outer surface, 154, of the first layer 16 itself may be surrounded by one or more layers of a relatively open braided, wound, or other reinforcement (not shown). Such reinforcement conventionally may be a nylon, polyester, or aramid filament or yarn. Also, the material of the second layer 18 maybe filled with a pigment or otherwise may contain a dye or other colorant such as for color-coding the tubing 150.

Thus, two or more layer tubular polymeric composites, and articles such as hose and tubing constructed thereof, have been described. As it is anticipated that certain changes may be made in the present invention without departing from the precepts herein involved, it is intended that all matter contained in the foregoing description shall be interpreted as illustrative and not in a limiting sense. All references including any priority documents cited herein are expressly incorporated by reference.

What is claimed is:

1. An article comprising a tubular polymeric composite member, said composite member comprising a tubular first layer and a tubular second layer concentric with and adjoining the first layer, wherein:

the first layer is formed of a first thermoplastic material having first functional groups; and the second layer is formed of a second thermoplastic material different from the first thermoplastic material and having terminal second functional groups different from the first functional groups and reactive therewith, the second thermoplastic material being fusion bondable to the first thermoplastic material and comprising a fluoropolymer, and the second layer being fusion bonded directly to the first layer.

2. An article comprising a tubular polymeric composite member, said composite member comprising a tubular first layer and a tubular second layer concentric with and adjoining the first layer, wherein:

the first layer is formed of a first thermoplastic material; and the second layer is formed of a second thermoplastic material different from the first thermoplastic material, the second thermoplastic material being fusion bondable to the first thermoplastic material and comprising the reaction product of a fluororesin copolymer and a peroxycarbonate initiator, and the second layer being fusion bonded directly to the first layer.

3. An article comprising a tubular polymeric composite member, said composite member comprising a tubular first layer and a tubular second layer concentric with and adjoining the first layer, wherein:

the first layer is formed of a first thermoplastic material having a thermal decomposition temperature of between about 150–260° C.; and the second layer is formed of a second thermoplastic material different from the first thermoplastic material and which is melt-processible at a temperature which is less than the thermal decomposition temperature of the first thermoplastic material, the second thermoplastic material being fusion bondable to the first thermoplastic material and comprising a fluoropolymer, and the second layer being fusion bonded directly to the first layer.

4. The article of claim 1 wherein:

the first functional groups functional groups are amide groups; and the second functional groups are carbonate groups.

5. The article of claim 1 wherein the second thermoplastic material comprises a fluororesin copolymer.

6. The article of claim 5 wherein the fluororesin copolymer has having terminal carbonate groups.

7. The article of claim 5 wherein the fluororesin copolymer comprises, based on the copolymer:

between about 30–81 mole % tetrafluoroethylene; and between about 19–70 mole % of at least one other monomer.

8. The article of claim 5 wherein the fluororesin copolymer comprises:

between about 40–81 mole % tetrafluoroethylene;

between about 6–43 mole % ethylene; and between about 10–30 mole % of hexafluoropropylene.

9. The article of claim 8 wherein the fluororesin copolymer further comprises between about 0–10% of a fluorovinyl compound.

10. The article of claim 5 wherein the second thermoplastic material has a melting point of between about 90–200° C. and a melt flow rate of between about 0.1–100 g/10 minutes under a load of 5 kg.

11. The article of claim 2 wherein the fluororesin copolymer comprises tetrafluoroethylene.

12. The article of claim 11 wherein the fluororesin copolymer further comprises ethylene.

13. The article of claim 1 wherein the first thermoplastic material comprises a polyamide.

14. The article of claim 1 wherein:

the composite member has a circumferential outer surface; and the article further comprises a reinforcement layer surrounding the outer surface of the composite member, the reinforcement layer including one or more filaments of one or more fibers braided or wound to surround the outer surface of the composite member.

15. The article of claim 14 wherein:

the article has an innermost surface; and the composite member has a circumferential inner surface formed by the second layer and forming the innermost surface of the article.

16. The article of claim 15 wherein:

the outer surface of the composite member is formed by the first layer.

17. The article of claim 1 wherein:

the article has an innermost surface and an outermost surface; and the composite member has a circumferential outer surface formed by the second layer and forming the outermost surface of the article, and a circumferential innermost surface formed by the first layer and forming the innermost surface of the article.

18. The article of claim 17 wherein the composite member is formed into a helical coil.

* * * * *